United States Patent [19]

Indzeoski

[11] Patent Number: 4,730,680
[45] Date of Patent: Mar. 15, 1988

[54] HOE AND GUARD THEREFOR

[76] Inventor: Harry Indzeoski, 729 Scotland Avenue, Winnipeg, Manitoba, Canada, R3M 1W7

[21] Appl. No.: 906,807

[22] Filed: Sep. 12, 1986

[30] Foreign Application Priority Data

Sep. 27, 1985 [CA] Canada ................... 491708

[51] Int. Cl.⁴ .......................... A01B 1/10; A45C 11/00
[52] U.S. Cl. ................... 172/375; 150/52 R; 172/438; 172/776; 206/349
[58] Field of Search ............... 172/371, 375, 438, 776; 206/349, 822; 150/52 R; 383/907; D8/11; D9/337, 436, 444

[56] References Cited

U.S. PATENT DOCUMENTS

| | | | |
|---|---|---|---|
| 1,152,957 | 9/1915 | Lowell | 206/349 |
| 1,349,596 | 8/1920 | Wosiewski | 206/349 X |
| 2,053,707 | 9/1936 | Farmer | 206/349 |
| 2,560,383 | 7/1951 | Carr | 206/349 |
| 3,318,499 | 5/1967 | Kallio | 206/349 |
| 3,512,631 | 5/1970 | Price et al. | 206/349 |
| 4,577,754 | 3/1986 | Jones | 206/349 |

FOREIGN PATENT DOCUMENTS 152320  7/1953  Australia ............... 172/375

*Primary Examiner*—Richard T. Stouffer
*Attorney, Agent, or Firm*—Ciotti & Murashige, Irell & Manella

[57] ABSTRACT

The hoe is formed from a tempered steel blade substantially, triangular when viewed in front elevation and secured at right angles to one end of the handle. The guard or sheath is formed from plastic or sheet metal, to protect the relatively sharp edges of the blade and to prevent injury to people when not in use. The guard, which is detachable, includes a pocket for receiving the sharp edges of the blade and flexible tabs detachably engaging over the edge of the blade to detachably retain the guard in position.

2 Claims, 4 Drawing Figures

HOE AND GUARD THEREFOR

BACKGROUND OF THE INVENTION

This invention relates to new and useful improvements in hoes and guards therefor.

The hoe which preferably includes a sickle blade from a reciprocating knife of a swather or the like, is provided with extremely sharp edges and is normally formed from a tempered steel.

This is secured at right angles on one end of a handle and is ideal for use in gardens and for general purpose scraping.

However, the extremely sharp edges of the blade make same somewhat dangerous when not in use, particularly when same is displayed for sale in a store inasmuch as the sharp edges can readily injure people with the slightest contact therewith.

Because of this a guard is required to detachably cover at least the sharpened edges of the blade, said guard being readily removed and replaced as desired.

SUMMARY OF THE INVENTION

In accordance with the invention, there is provided the combination of a hoe blade secured at right angles to one end of an elongated handle and a guard therefore, said hoe blade having a substantially truncated triangular configuration when viewed in front elevation and having an upper edge attached to said handle, a pair of side edges inclining inwardly and away, one from each end of said upper edge and a relatively short lower edge extending between the distal ends of said side edges and parallel to said upper edge, said side edges and said lower edge being sharpened, said guard having a pocket receiving said portion of said hoe blade defined by said side and lower edges and means extending from said guard detachably securing said guard to the upper edge of said blade.

Another aspect of the invention is to provide a guard for hoe blades which include an elongated handle. said hoe blade having a substantially truncated triangular configuration when viewed in front elevation and having an upper edge attached to said handle, a pair of side edges inclining inwardly and away, one from each end of said upper edge and a relatively short lower edge extending between the distal ends of said side edges and parallel to said upper edge, said side edges and said lower edge being sharpened, said guard comprising in combination a pocket receiving said portion of said hoe blade defined by said side and lower edges and means extending from said guard above said pocket detachably securing said guard to the upper edge of said blade.

A yet further advantage of the invention is to provide a hoe and a guard therefor both of which are simple in construction, economical in manufacture and otherwise well suited to the purpose for which it is designed.

With the foregoing in view, and other advantages as will become apparent to those skilled in the art to which this invention relates as this specification proceeds, the invention is herein described by reference to the accompanying drawings forming a part hereof, which includes a description of the best mode known to the applicant and of the preferred typical embodiment of the principles of the present invention, in which:

DESCRIPTION OF THE DRAWINGS

In the drawings like characters of reference indicate corresponding parts in the different figures.

DETAILED DESCRIPTION

Figure 1:
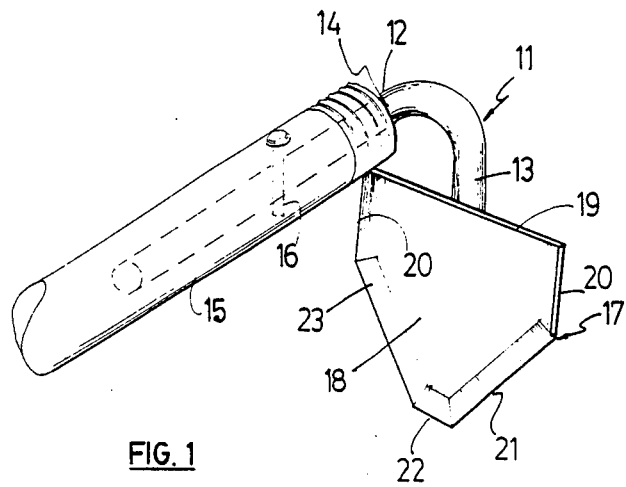
FIG. 1 is an isometric view of the hoe per se.
Figures 2, 3:
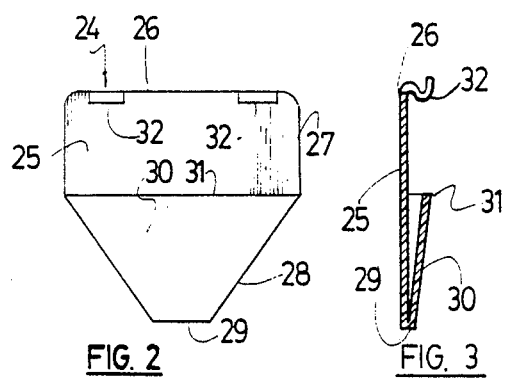
FIG. 2 is a front elevation of the guard per se.
FIG. 3 is a section along the line 3—3 of FIG. 2.

Proceeding therefore to describe the invention in detail, reference character 10 illustrates an elongated, handle to which the hoe assembly collectively designated 11 is secured.

The hoe assembly includes a stem 12 having a distal end 13 formed at right angles to the longitudinal axis of the stem 12 with the inner end 14 of the stem being inserted within an aperture in one end 15 of the handle 10 and being held in position by means of a rivet 16 and/or adhesive (not illustrated).

The hoe blade collectively designated 17 forming part of the hoe assembly 11, is preferably a tempered steel sickle knife blade or cutting knife blade normally used in reciprocating knives on swathers. combines and the like. It will be appreciated that other hoe blades can be utilized or the hoe blade can be formed in a similar configuration to that illustrated.

The blade 17 consists of a substantially truncated triangular plate 18 having an upper edge 19, as pair of short upper side edges 20 extending substantially at right angles downwardly, one from each end of the upper edge 19. These side edges then incline inwardly and downwardly as at 21, to terminate in a relatively short lower edge 22 spaced and parallel from the upper edge 19.

The inclined or converging side edges 21 and the lower edge 22 are edge sharpened as at 23 and this blade, is welded or otherwise secured to the distal end of the downturned portion 13 of the stem, said securement being substantially intermediate the side edges 20.

As such, the hoe is extremely useful in gar dens for cultivating, weeding, edging and other purposes for which hoes are generally utilized. It can also be used, particularly with a relatively short handle 10 for loose paint scraping, concrete mixing in small quantities and other general uses.

However, due to the extreme sharpness of the edges 21 and 22, the device is somewhat dangerous when left unattended as these sharp edges may readily cause damage to clothing as well a readily cutting people when handling the hoe or if the hoe becomes displaced and falls.

Therefore, I have provided a guard or shield collectively designated 24 adapted to engage over at least the sharpened edges 21 and 22 of the blade, when not in use.

This guard can be made from relatively thin metal, but is preferably formed from plastic and includes a back panel 25 similar in configuration to the blade 17 when viewed in front elevation. It includes an upper edge 26, upper vertical side edges 27 extending downwardly one from each end of the upper edge 26 and inwardly and downwardly converging side edges 28 terminating in a relatively short horizontal base 29 spaced and parallel to the edge 26.

Figure 4:
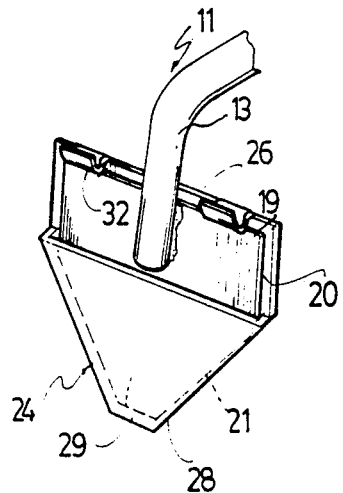
FIG. 4 is a fragmentary isometric view of the hoe with the guard in position thereon.

A front panel 30 is formed integrally with the back panel 25 and is joined to the lower half of the back panel along the converging sides 28 and the base 29 with the upper edge 31 of the front panel also being spaced and parallel to the edges 26 and 29 and being situated intermediate these edges. This upper edge 31 of the front panel 30 is spaced from the back panel to define a pocket with the dimensions of the guard being slightly larger than the dimensions of the blade so that the guard may slip over the blade readily and easily as shown in FIG. 4 thus protecting the sharpened edges 22 and 223.

Means are provided to detachably secure the guard to the blade, said means preferably taking the form of at least one, but preferably two, flexible lips 32 formed integrally with the upper edge 26 of the rear panel 25 of the guard and extending therefrom on the side of the front panel 30. These lips are curved and are resilient and are adapted to snap-engage over the top edge of the blade when urged in the direction of arrow 33 once the guard has been engaged over the blade.

These resilient tabs are easily disengaged frome the upper edge 19 of the blade when it is desired to remove the guard from the blade, and as mentioned previously, it is desirable to manufacture the guard from a synthetic plastic material to facilitate this snap engaging action.

Since various modifications can be made in my invention as hereinabove described, and many apparently widely different embodiments of same made within the spirit and scope of the claims without departing from such spirit and scope, it is intended that all matter contained in the accompanying specification shall be interpreted as illustrative only and not in a limiting sense.

I claim:

1. The combination of a hoe blade secure at right angles to one end of an elongated handle and a guard therefor, said hoe blade having a substantially planar, truncated, triangular configuration when viewed in front elevation and having an upper edge attached to said handle, a pair of side edges inclining inwardly and away, one from each end of said upper edge and a relatively short lower edge extending between the distal ends of said side edges and parallel to said upper edge, said side edges and said lower edge being sharpened, said guard having a pocket receiving said portion of said hoe blade defined by said side and lower edges and means extending from said guard detachably securing said guard to the upper edge of said blade said means including at least one flexible and resilient tab detachably engageable over said upper edge of said blade in snap engagement therewith, said guard, when viewed in front elevation, including an upper edge, a pair of spaced and parallel side edges extending at right angles to said upper edge, a pair of pocket side edges extending from the distal ends of said edges of said guard and converging inwardly therefrom and a horizontal base extending between the distal ends of the side edges of said pocket, parallel to said upper edge of said guard, said means detachably securing said guard to said upper edge of said blade being situated on said upper edge of said guard, said pocket terminating in a horizontal open side intermediate the upper and lower edges of said guard.

2. A guard for a hoe blade, wherein the hoe blade is secured to an elongated handle, said hoe blade having a substantially planar, truncated, triangular configuration when viewed in front elevation and having an upper edge attached to said handle, a pair of side edges inclining inwardly and away, one from each end of said upper edge and a relatively short lower edge extending between the distal ends of said side edges, and parallel to said upper edge, said side edges and said lower edge being sharpened, said guard comprising in combination a pocket adapted to receive the portion of the associated hoe blade defined by said side and lower edges and means extending from said guard above said pocket adapted to detachably secure said guard to the upper edge of the associated blade, said means including at least one flexible tab detachably engageable over the upper edge of the blade in snap engagement therewith, said guard, when viewed in front elevation, including an upper edge, a pair of spaced and parallel side edges extending at right angles to said upper edge, a pair of pocket side edges extending from the distal ends of said side edges of said guard and converging inwardly therefrom and a horizontal base extending between the distal ends of the side edges of said pocket, parallel to said upper edge of said guard, said means adapted to detachably secure said guard to the upper edge of the associated blade situated on said upper edge of said guard, said pocket terminating in a horizontal open side intermediate the upper and lower edges of said guard.

* * * * *